No. 828,516. PATENTED AUG. 14, 1906.
A. C. F. SCHRÖDER.
PIPE.
APPLICATION FILED DEC. 14, 1905.
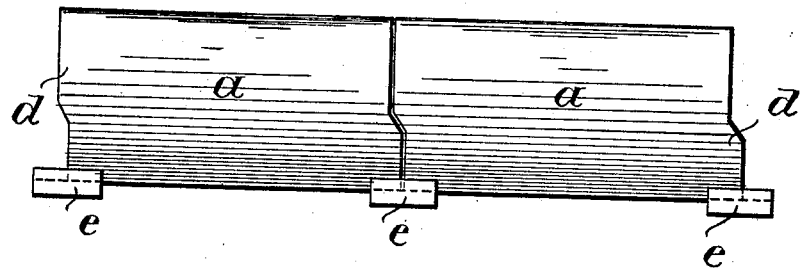
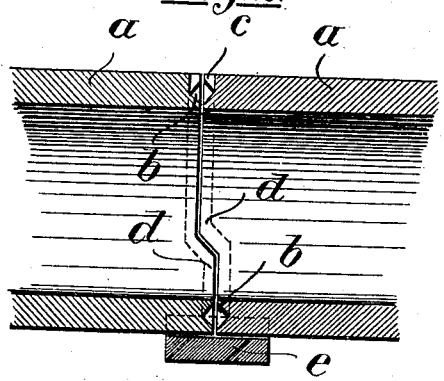
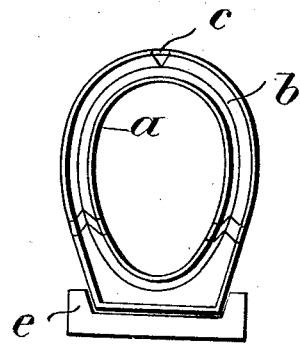
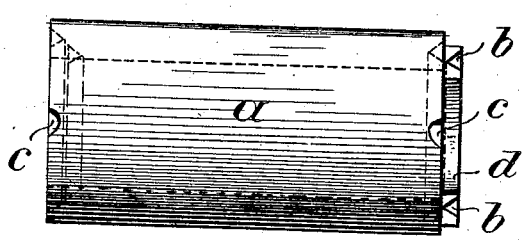
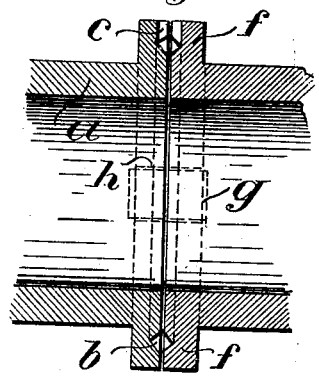
Witnesses:
August Carl Friedrich Schröder
Inventor,
by William F. Hall
his attorney.

UNITED STATES PATENT OFFICE.

AUGUST CARL FRIEDRICH SCHRÖDER, OF CASSEL, GERMANY.

PIPE.

No. 828,516.　　　　　Specification of Letters Patent.　　　Patented Aug. 14, 1906.

Application filed December 14, 1905. Serial No. 291,782.

*To all whom it may concern:*

Be it known that I, AUGUST CARL FRIEDRICH SCHRÖDER, a subject of the German Emperor, residing at Cassel, Eulenburgstrasse, in the Kingdom of Prussia and Province of Hesse-Nassau, Germany, have invented certain new and useful Improvements in Pipes, of which the following is a specification, reference being had therein to the accompanying drawings.

The known socket-pipes of earthenware, cement, cast-iron, and the like present the defect that it is impossible to tighten their joints with perfect safety in case they are not laid exactly. In the manufacture of socket-pipes, particularly those of earthenware and cement, the sockets frequently turn out to be irregular, so that a good tightness cannot be guaranteed, even if the utmost care be taken. This is obvious when it is remembered that in case a socket is not perfectly round or circular in cross-section or if its internal diameter is too small, or if the external diameter of the end of a pipe engaging in this socket is too large a space will be formed between the socket and the pipe end which can never be so well filled up as is absolutely necessary. The consequence of this is that either the underground water will enter the pipe system or the water will escape from the pipes into the soil, according to the circumstances. The continual influx of underground water and sand into the pipe system or the run of the water out of the same will impair the pipes, so that the whole pipe system is thereby rendered unsafe.

My invention relates to improvements in pipes whereby the said defects are avoided in a very simple manner and a perfect tightness of the joints of the pipe system is guaranteed.

The objects of my improvement are, first, to provide the end faces of the pipes each with a groove, so as to form in every joint a space along the periphery which can be filled up with a tightening material after the laying of the pipes, and, second, to provide means for securing the pipes in their mutual position. I attain these objects by the constructions illustrated in the accompanying drawings, in which—

Figure 1 is an elevation of two pipes jointed together. Fig. 2 is a vertical longitudinal section, on an enlarged scale, through the adjoining parts of the same. Fig. 3 is an end view of one of these pipes. Fig. 4 is a plan of one of these pipes, and Fig. 5 is a vertical longitudinal section through the adjoining ends of two modified pipes.

Similar letters of reference refer to similar parts throughout the several views.

Fig. 1 shows two pipes *a a* of earthenware or cement without any socket, the end faces of which pipes are each provided with a groove *b* between the external and the internal edge and, moreover, with shoulders *d*. The groove *b* is in Fig. 3 shown as not of a uniform cross-section, but of a shape corresponding to that of the end face of the pipe. At the top of the end face a cut *c* is provided, which communicates with the groove *b*. It will be seen that on putting together two pipes *a a* a space will be formed in the joint by the two grooves *b b*, which space communicates to without through a hole formed by the two cuts *c c*. The shoulders *d* of the one pipe *a* will bear on those *d* of the other pipe *a*, so that the correct common axis of the two pipes *a a* is insured. Thereby also the laying of the pipes is facilitated. After the setting of the pipes the spaces between their end faces are filled up with a suitable tightening material—such as cement, asphalt, or the like—which is poured into the holes formed by the cuts *c c*. In certain cases—for example, if the diameter of the pipes is large or if the filling-up material becomes very quickly torpid—it may be advisable to provide besides the cuts *c c* at the top similar cuts on the sides of the end faces, so as to render the path shorter through which the filling-up material has to travel, so that it cannot become too prematurely torpid. This material serves as a cement for rigidly connecting the several pipes, so that any influx of the underground water into the pipe system or any running off of the water from the pipe system is rendered impossible.

Where so preferred, plates *e e* of the shape shown may be placed beneath the joints of the pipes for the purpose of not only insuring the correct common axis of the pipes, but also of preventing the liquid tightening material when cast from flowing off. These plates *e e* will also facilitate the laying of the pipes, since their upwardly-projecting ends inclose the corners of the adjoining pipes, as will be clear from an examination of the drawings.

In case the pipes *a a* are made of cement and iron rods in the manner invented by Monier of course the longitudinal iron rods may be made to project from the one end face of the pipe and be arranged for entering corresponding recesses or holes in the end face of the adjoining pipe. Thereby of course the common axis of the several pipes will be insured.

According to Fig. 5 the pipes may be modified in that they are provided with plain flanges $f$ at both ends, in which flanges grooves $b$ and cuts $c$ of a suitable cross-section are formed. In this case of course the laying of the several pipes will be still further facilitated, since there are no sockets at all and any of the pipes can be at once inserted, between two neighboring pipes. For insuring the correct common axis of the pipes $a\ a$ their flanges $f$ are provided on the outside with several recesses $h$, into which wedges $g$ can be longitudinally driven. The recesses $h$ of the one flange should register with those $h$ of the other flange and they should remain without the grooves $b$. This construction also presents the advantage that any broken pipe can be at once replaced by a new one without disturbing the adjoining pipes.

It is to be noted that the pipes of either construction described can be well connected in case their axis should be not straight, but broken, or if the several pipes are not exactly laid.

What I claim as my invention, and desire to secure by Letters Patent, is—

1. A pipe length having channeled opposite ends and a radial recess leading outwardly from each channel, said channels having parts of different areas, substantially as described.

2. A pair of pipe-sections having corresponding channels in contiguous ends designed to match and form an inclosed pocket and registering radial cuts in the ends of the pipe providing, when the lengths of pipes are matched, an opening leading outwardly from said inclosed pocket, substantially as described.

3. A pair of pipe-sections having end flanges with corresponding channels in said flanges designed to match and form inclosed pockets and radial cuts providing openings leading outwardly from said pockets, substantially as described.

In testimony whereof I have affixed my signature in presence of two witnesses.

AUGUST CARL FRIEDRICH SCHRÖDER.

Witnesses:
 CARL BEMME,
 — RUPFKE.